Figure 1:
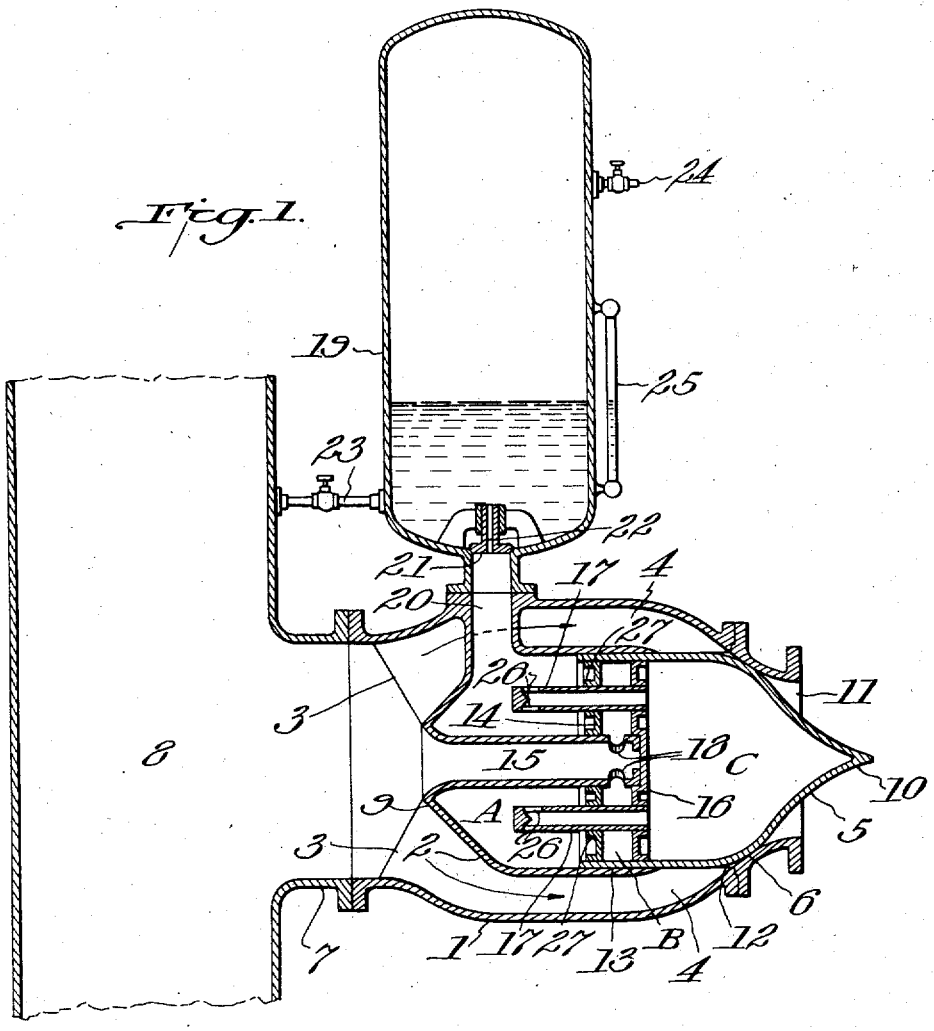

L. N. McCLELLAN ET AL

May 30, 1933. PRESSURE RELIEF VALVE Re. 18,850

Original Filed Jan. 18, 1929

Inventors:
Phillip A. Kingie
John L. Savage,
Leslie N. McClellan,
Charles M. Day,
By Byron Townsend & Brickenstein,
Attorneys.

Reissued May 30, 1933 Re. 18,850

UNITED STATES PATENT OFFICE

LESLIE N. McCLELLAN, PHILLIP A. KINZIE, JOHN L. SAVAGE, AND CHARLES M. DAY, OF DENVER, COLORADO, ASSIGNORS TO UNIVERSAL HYDRAULIC CORPORATION, OF DENVER, COLORADO, A CORPORATION OF COLORADO

PRESSURE-RELIEF VALVE

Original No. 1,795,662, dated March 10, 1931, Serial No. 333,458, filed January 18, 1929. Application for reissue filed November 9, 1932. Serial No. 641,945.

This invention relates to a device for relieving pressure in a pressure fluid conduit, pipe line or the like, in the event of establishment therein of fluid pressures in excess of those normally obtaining under ordinary working conditions.

The main object of the invention is to provide a valve for connection to a conduit or pipe line under pressure, such as the discharge pipe from a pump or a penstock leading to a hydraulic turbine, in which the conduit is subject to rise of pressure above normal due to rapid decrease of velocity in the conduit.

Such a rise in pressure, often termed "water hammer", is always encountered in long pipe lines when the velocity of the fluid passing through same is rapidly decelerated, as, for instance, in a power penstock when a large load is thrown off from the turbine. Any hydraulic machinery, for example the turbine itself, is subject to serious damage from excessive pressure rise under these conditions unless the pressure is relieved by suitable means.

The relief valve of our invention prevents excessive pressure rise in such a conduit or pipe line by opening automatically at a predetermined pressure, thus releasing a part of the flow of fluid and avoiding the too rapid deceleration of velocity of the fluid in the conduit or pipe line.

The specific application of our invention just described is illustrative only, it being obvious that it is susceptible of a variety of uses.

The invention consists in a pressure relief valve having a valve body in which is arranged a cylinder so supported relatively to the body as to provide a substantially annular fluid passage between the cylinder and body, a movable valve needle carried by the cylinder and slidable with respect thereto toward and away from a seat in the body, and diaphragms so arranged as to form a plurality of pressure chambers within the cylinder and valve needle whereby movement of the needle may be effected in response to variations in the balance of pressures normally obtaining in the several chambers. The cylinder and valve needle are in communication with the conduit within which pressure is to be controlled and they are also in communication with a tank which is connected to the conduit and receives liquid therefrom, the tank being also connected with a source of air under pressure, whereby the level of the liquid in the tank may be regulated. By this arrangement we provide for such a balance of pressures in the several chambers mentioned that the valve needle will normally remain seated but will open to exhaust fluid from the conduit in case of rapid rise of pressure therein, as we will proceed now to explain and finally claim.

In the accompanying drawing illustrating the invention, in the several figures of which like parts are similarly designated, Fig. 1 is a schematic sectional view of the relief valve of our invention in an appropriate installation.

Figure 2:
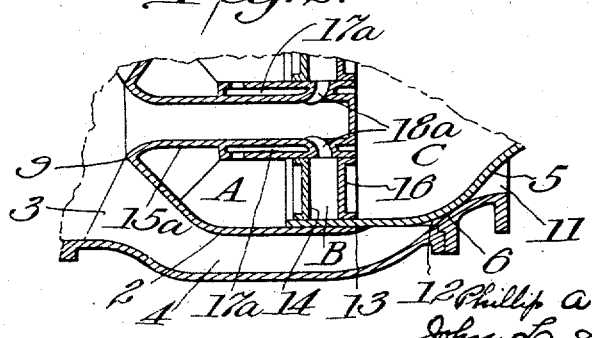

Fig. 2 is a fragmentary sectional detail of modified structural features of the valve.

The relief valve of our invention comprises a preferably substantially cylindrical casing or body 1, provided with a concentric bullet-shaped cylinder 2 so supported within the body by radial ribs 3 as to form an annular waterway or passage 4 between the body 1 and cylinder 2. The cylinder 2 is fitted with a slidably movable valve element or needle 5 arranged to telescope within the cylinder so that it may move toward and away from a seat 6 in the valve body to open and close the valve.

The valve body is connected to an outlet 7 of the conduit 8 in such manner that the pointed end or nose 9 of the cylinder 2 faces the conduit 8 and the pointed end or nose 10 of the needle 5 faces away from the conduit and in the direction of flow through the valve, as indicated by the arrows (Fig. 1). This arrangement of the needle, we believe, is novel in valves of this character, and possesses marked advantages among which is the fact that the needle is thus pointed in the proper direction to discharge high velocity flow from the conduit.

Moreover, the annular passage 4 is always filled with water when the valve is closed and the outlet 11 discharges to atmosphere. The advantage of maintaining the passage 4 filled with water will be apparent as the description proceeds.

When the needle 5 is seated, the portion of its shoulder 12 which lies outside the circumference of the seat 6 is subject to conduit pressure, whereas the portion which lies within the circumference of the seat is subject to atmospheric pressure.

The inner telescoping extension 13 of the needle 5 is provided with a diaphragm 14, fixed to it and acting as an annular piston within the cylinder 2 between its inner wall and the outer wall of a concentric axial tube 15. This tube 15 connects with and forms an opening through the pointed nose 9 of the cylinder 2 at one end, and at its other end supports a fixed diaphragm 16 arranged within and in sliding contact with the extension 13 of needle 5. The space enclosed by the cylinder 2 and needle 5 is thus divided by the diaphragms 14 and 16 into three separate tandem pressure chambers A, B and C.

Chamber A is in communication with chamber C through tubes 17, or other suitable means such as the passages 17*a* (Fig. 2) formed in the wall of the tube 15*a*. Thus water can readily pass from chamber A to chamber C, and vice versa, as the needle 5 moves toward and away from its seat 6 in the normal operation of the valve, and the pressures in these two chambers are thus equalized at all times. Chamber B is supplied with conduit pressure through the tube 15 and ports 18 (or through tube 15*a* and ports 18*a*, Fig. 2).

Chamber A is connected with a closed tank 19 by means of a duct 20 provided with a check valve 21 opening against pressure in tank 19 and provided with a by-pass bore 22. Thus a full flow of water from chamber A into tank 19 is permitted but flow from tank 19 into chamber A is restricted by the by-pass bore 22.

Communication between tank 19 and conduit 8 is afforded by means of a valved pipe 23 forming a variable throttle connection which will admit water at conduit pressure to the tank very slowly, and the tank is also provided with a valved air connection 24 through which air may be pumped into the tank or permitted to escape from it, as required, to properly adjust the water level in the tank as indicated by the sight gage 25.

The operation of our valve is substantially as follows:

We will assume that the parts are in the positions shown, with the valve in pipe 23 open and water at conduit pressure in tank 19 cushioned against an equal pressure of air in the top of the tank. Chamber A will be full of water at conduit pressure, which has entered it through bore 22, and chamber C will likewise be full of water at conduit pressure communicated through tubes 17 (or 17*a*) from chamber A. Chamber B will be full of water at conduit pressure communicated through tube 15 and ports 18 (or tubes 15*a* and ports 18*a*).

With the relief valve closed and normal pressures thus established in the chambers A, B and C, the needle 5 will be subjected to two forces tending to hold it to its seat, namely, conduit pressure in chamber A acting against diaphragm or piston 14, and conduit pressure in chamber C acting against the interior surface of the needle. The needle will also be subjected to two forces tending to move it away from its seat, namely, conduit pressure in chamber B acting against diaphragm or piston 14, and conduit pressure in passage 4 acting against the exposed surface of shoulder 12 of the needle. The sum of the forces tending to hold the needle to its seat is greater than the sum of the forces tending to move it way from its seat, because the areas acted upon by the former are greater than those acted upon by the latter, whereas the unit pressures are equal.

It is obvious, therefore, that the needle 5 will not be unseated under normal pressures, nor will it be unseated by a rise in pressure in the conduit if such rise is so gradual as to permit the balancing therewith of the pressures in chambers A and C by communication through pipe 23, tank 19 and bore 22 substantially as rapidly as the pressure rise is communicated to chamber B and affects shoulder 12.

However, if a sudden pressure rise occurs, the valve will open because the pressure will be suddenly built up in chamber B and in the passage 4 against shoulder 12, and as the needle telescopes into cylinder 2 the water will be expelled from chambers A and C through duct 20 and past check valve 21 into tank 19 against the perfectly elastic cushion of air therein, there being no appreciable increase of pressure in tank 19 as a result. Furthermore, it will be apparent that the water pressure tending to unseat the needle acts directly against the two separate pressure areas through relatively large openings and passages, whereas the pressures tending to hold it to its seat are communicated through restricted openings and passages, with the result that the latter do not commence to function effectively until after the valve has opened.

The pressure rise necessary to open the valve depends upon the ratio of the projected area of needle 5 subject to closing pressures to the projected areas of the needle subject to opening pressures. If, for example, the former are twenty percent greater than the latter, the pressure in circuit 8 will have to increase a little more than twenty percent to force the needle 5 away from its seat to open position.

The percentage of pressure rise in the conduit above normal, which is to actuate the relief valve, must be known in order to determine the design of the parts of the valve so that the proper ratio of pressure closing areas to pressure opening areas may be provided. This percentage of actuating pressure rise above normal will remain constant regardless of changes in the conduit pressure, provided such changes occur slowly.

The duct 20 is made relatively large so as to provide for unrestricted flow of water from chambers A and C into tank 19 and thus permit instantaneous opening of the relief valve, and is sufficiently large to permit low velocity flow from these chambers and thus minimize resistance to the opening of the valve. The check valve 21 will open instantly to admit the water from chambers A and C to the tank, so that the needle 5 will not be held against rapid opening movement, but when the check valve has again seated the flow of water from the tank back into chambers A and C will take place slowly through the restricted bore 22 and the needle will therefore move slowly to its seat.

Needle 5 is prevented from slamming in the wide open position by reason of the restriction of openings 26 in tubes 17 caused by the flanges 27 of diaphragm or piston 14 as the needle moves to open position, thus forming, in effect, a dash pot of chamber C. Moreover, the movement of the needle in both its seating and unseating directions is dampened by the effect of diaphragm 14 acting between chambers A and B.

If desired, the pipe 23, which affords communication between the conduit 8 and tank 19, may be omitted, and the valve needle 5 held closed by direct air pressure in tank 19 and chambers A and C and this air pressure controlled by the valve in pipe 24. With this use of air pressure the inertia of the displaced water is eliminated and the sensitiveness of the valve materially increased.

In other valves of this general type with which we are familiar, the use of air alone in this connection has been found to be impractical for the reason that the air tends to escape to atmosphere past the needle of the valve the latter usually being sealed against atmosphere only by an air-sealing packing which, from a practical standpoint, is insecure. With our valve, however, no difficulties are encountered in holding the air pressure for the reason that at all points where it would have a tendency to escape (such as around the needle at the open end of cylinder 2, and past diaphragms 14 and 16 and through ports 18) it is counteracted by an equal pressure of water. In this particular, one of the advantages of the arrangement of our valve, with the needle closing against atmospheric rather than against conduit pressure, will be evident, and this arrangement of the valve forms an important feature of our invention.

Various changes in details of construction and arrangement of parts are contemplated as within the spirit of the invention and the scope of the following claims.

We claim:

1. A relief valve for a pressure fluid conduit, including, in combination, a valve body, a cylinder arranged in said body, a valve needle arranged in said cylinder and seating against said body, means defining a plurality of pressure chambers within said cylinder and needle, and a pressure tank in communication with certain of said chambers, the other chamber and said body being in communication with said conduit, said needle being held to its seat by pressure in said tank under normal conduit pressures and being moved to open position upon occurrence of abnormal pressure rise in said conduit.

2. A relief valve for a pressure fluid conduit, including in combination, a valve body, a cylinder arranged in said body and providing a passage between it and the body, a seat in said body, a valve needle carried by said cylinder and movable relatively to said seat to open and close said passage, means defining a plurality of pressure chambers within said cylinder and needle, and a pressure tank in communication with certain of said chambers, the other chamber and said passage being in open communication with said conduit, said needle being held to its seat by pressure in said tank under normal conduit pressures and being unseated to open said passage and vent said conduit upon occurrence of abnormal pressure rise in said conduit acting in said last-mentioned chamber and in said passage.

3. A relief valve, including, in combination, a valve body, an internal cylinder mounted in said body and forming an annular passage between it and the body, an air tank communicating with said cylinder, a movable needle telescoping into said cylinder and seating against said body, a central tube mounted in said cylinder, a fixed diaphragm carried by said tube within the movable needle, and an annular piston carried by said needle and acting between the inside of the fixed cylinder and the central tube, said movable needle having four differential areas of which two are exposed to the pressure to be relieved tending to open the valve and the others are exposed to the pressure in the air tank to normally hold the valve closed.

4. A relief valve for a pressure fluid conduit, including, in combination, a valve body, an internal cylinder fixed to said body and providing an annular passage between it and the body through which conduit pressure is relieved, an air tank communicating with the fixed cylinder, an open ended tube attached at one end to said cylinder and supporting at its other end a fixed diaphragm, a movable needle telescoping into said cylinder and cooperating with the fixed diaphragm, an annular piston carried by the movable needle and cooperating with the inside of said cylinder and the outside of said central tube, three tandem compartments being formed within said needle and cylinder by said diaphragm and piston, and means for equalizing the pressure to be relieved and the pressure in the tank for slow conduit pressure changes but to restrict the pressure in the tank for sudden conduit pressure changes.

5. A relief valve for pressure fluid conduits, having a movable needle element adapted to open to relieve sudden conduit pressure rise and upon which the pressure to be relieved acts directly against two separate pressure areas, means including a gaseous medium to normally hold the movable element in closed position and means for communicating a relatively slow conduit pressure rise to said fluid medium to hold the movable element closed against said slow pressure rise.

6. In a relief valve, a movable needle element provided with two separate pressure areas exposed to and operated upon by the pressure to be relieved to open the valve, means for normally holding the movable element in closed position under pressure including a gaseous medium, and means for equalizing the pressure from the gaseous medium and the pressure to be relieved under normal rises of pressure of the said pressure to be relieved and for excluding sudden rises in pressure from the gaseous medium, so that the movable needle element will open only under sudden pressure rises.

7. A relief valve having, in combination, a movable valve element provided with four separate differential pressure areas of which two are exposed to the pressure to be relieved tending to open the valve, and a tank containing a gaseous medium under pressure, said medium acting upon the other two differential areas to normally hold the valve closed and adapted to permit the valve to open under sudden rise in the pressure to be relieved.

8. A relief valve having, in combination, a movable valve needle element provided with four separate differential pressure areas of which two are exposed directly to the pressure to be relieved tending to open the valve, a tank containing a gaseous medium under pressure acting upon the other two differential areas to normally hold the valve closed and adapted to permit the valve to open under sudden rise in the pressure to be regulated and means for automatically equalizing the pressure to be regulated and the pressure in the tank for slow but not for sudden rises in the pressure to be regulated.

9. In combination, a fluid conduit in which pressure is to be relieved, a pressure relief valve connected with said conduit and having a movable valve element provided with three separate differential pressure chambers, one of which is exposed to the pressure in the conduit, an air tank communicating with the other two differential pressure chambers of the movable valve element, and a variable connection between the conduit and the tank for communicating slow conduit pressure rises to said tank to hold said valve closed against the influence of said slow pressure rises.

10. In combination, a fluid conduit in which pressure is to be relieved, a pressure relief valve connected with said conduit and having a movable valve element provided with four separate differential pressure areas two of which are exposed to the pressure in the conduit, an air tank communicating with the other two differential pressure areas of the movable valve element, a throttle connection between the conduit and the tank, and a check valve between the tank and the two differential pressure areas exposed to pressure from the tank.

11. In combination, a water conduit in which sudden rises in pressure are to be relieved, a valve body connected with said conduit and containing an internal cylinder providing between it and the body an annular water passage affording communication between the conduit and the atmosphere, an air tank communicating with said cylinder, a throttle fluid connection between said conduit and tank for equalizing gradual changes of pressure between said tank and conduit, a movable needle element telescoping into said cylinder and seating against said valve body to control communication through said passage and providing four separate differential pressure areas of which two are exposed to the pressure in the conduit tending to open said passage and the other two are exposed to the pressure in the tank tending to close said passage.

12. In combination, a water conduit in which sudden rises in pressure are to be relieved, a valve body connected with said conduit, an internal cylinder providing between it and the body an annular water passage affording communication between the conduit and the atmosphere, an air tank communicating with said cylinder, a throttle fluid connection between the conduit and tank for equalizing gradual changes of pressure between said tank and conduit, a movable needle element telescoping within the cylinder and cooperating as a valve with the valve body to control communications between the conduit and the atmosphere and with the internal cylinder to retain tank pressure, said needle element providing four separate differential pressure areas of which two having the smaller combined area are exposed to conduit pressure and of which two having the larger combined area are exposed to the pressure in said tank, and a check valve interposed between the cylinder and tank and provided with a by-pass.

13. In combination, a fluid conduit in which sudden pressure is to be relieved, a pressure relief valve provided with a valve needle element having its nose exposed to atmosphere and having two separate differential pressure areas exposed to pressure in the conduit, and means including a tank containing air under pressure, said pressure acting on two separate differential pressure areas of said movable needle element and controlled by conduit pressure for normally holding said element in closed position during slow variations in conduit pressure and for permitting it to open upon sudden increase of conduit pressure on the other two differential pressure areas.

14. In a pressure relief valve, the combination with a valve body having an inlet end and a discharge end, of a hollow member supported within the body and spaced therefrom to form an annular passageway, said member having a conical inner end, an axial tube opening from the conical end of said member and extending to the opposite end thereof, a hollow valve needle element mounted in said member and having a diaphragm at its inner end through which said tube passes, a fixed diaphragm on the end of said tube and fitting within said needle element, said element having a conical outer end, said diaphragms enclosing a central pressure chamber, separate end pressure chambers enclosed by the fixed diaphragm and the conical end of the needle element and by the movable diaphragm and the conical end of the hollow member respectively, the closing movement of said plunger decreasing the volume of the central pressure chamber, a valve seat formed in the discharge end of the body and against which said needle element seats, a pressure air tank supplying pressure to the two end pressure chambers, a throttled connection supplying conduit pressure to said air tank, and a check valve permitting free flow of pressure from said end pressure chambers to said air tank but throttling flow of pressure from said air tank to said end pressure chambers, the central pressure chamber being supplied with conduit pressure through said axial tube.

15. In a relief valve, a valve body, needle element arranged therein and movable relatively thereto to control the passage of fluid through the valve, means for normally holding the needle in valve-closing position under pressure, including a gaseous medium acting against said needle, the closing movement of said needle being in the direction of fluid passage through the valve, whereby when the valve is closed a body of fluid under pressure will be confined within the valve body and will prevent the escape of said gaseous medium.

16. In a relief valve, a valve body provided with a fluid flow passage, a movable needle element for controlling said passage and provided with two separate pressure areas exposed to and operated upon by the pressure to be relieved to open the valve, means for normally holding the movable element in closed position under pressure including a gaseous medium acting against the said movable element, and means for equalizing the pressure from the gaseous medium and the pressure to be relieved under normal rises of pressure of the said pressure to be relieved and for excluding sudden rises in pressure from the gaseous medium so that the movable needle element will open only under sudden pressure rises, said needle element functioning to normally maintain said passage filled with fluid to prevent the escape of said gaseous medium by thus holding fluid at equal pressure at all points where the gaseous medium would tend to escape.

17. A relief valve having, in combination, a movable valve element provided with four separate differential pressure areas of which two are exposed to the pressure to be relieved tending to open the valve, and a tank containing a gaseous medium under pressure, said gaseous medium acting upon the other two differential areas to normally hold the valve closed and adapted to permit the valve to open under sudden rise in the pressure to be relieved, said valve element functioning to prevent the escape of said gaseous medium by holding fluid at equal pressure at all points where the gaseous medium would tend to escape.

18. A relief valve having, in combination, a movable valve needle element provided with four separate differential pressure areas of which two are exposed directly to the pressure to be relieved tending to open the valve, a tank containing a gaseous medium under pressure acting upon the other two differential areas to normally hold the valve closed and adapted to permit the valve to open under sudden rise in the pressure to be regulated, and means for automatically equalizing the pressure to be regulated and the pressure in the tank for slow but not for sudden rises in the pressure to be regulated, said needle element functioning to prevent the escape of said gaseous medium by holding fluid at equal pressure at all points where the gaseous medium would tend to escape.

19. A relief valve comprising a valve body, a shell within said body and spaced therefrom to define an annular water passage, a needle telescoping in said shell and adapted to engage a valve seat on said body, a diaphragm within said needle, a diaphragm tube connecting said diaphragm to said shell, a head on said needle and cooperating with said diaphragm to form three tandem pressure chambers within said shell and needle, said diaphragm tube opening into and providing communication between the water passage and the middle compartment, a pressure fluid inlet into the compartment formed by said shell and needle head, and means providing passages for the equalization of pressure in the two end compartments.

20. The invention as set forth in claim 19, wherein said means comprises a pressure fluid tube parallel to said diaphragm tube, and means securing the pressure fluid tube to the diaphragm, said pressure fluid tube extending through and having a sliding fit in the needle head.

21. The invention as set forth in claim 19, wherein said means comprises a sleeve surrounding said diaphragm tube to form an annular passage which is open to the two end compartments.

22. A valve comprising a valve body having a fluid conduit therethrough, a shell within said body, a needle telescoping within said shell and adapted to engage a seat carried by said body to close the valve, a diaphragm within said needle, a diaphragm tube supporting said diaphragm from said shell, an annular head on said needle and serving with said diaphragm as transverse walls dividing into three tandem compartments the space within the telescoping members constituted by said inner shell and needle, said tube having an opening affording communication between the interior of the tube and the middle compartment, and means within said telescoping members and outside of said tube providing a passage for the transfer of pressure fluid to and from another of said compartments.

23. The invention as set forth in claim 22, wherein the circumferential wall of said diaphragm tube joins the said shell and the interior of said tube opens directly into the fluid conduit at the inlet end of said valve, and the opening in said tube affords communication with the middle compartment.

24. The invention as set forth in claim 22, wherein said means comprises a pressure fluid tube secured to said diaphragm and extending through said annular head, said pressure fluid tube opening into the compartment formed by said diaphragm and the nose of said needle.

25. A valve comprising a valve body having a fluid conduit therethrough, a shell within said body, a needle telescoping within said shell and adapted to engage a seat carried by said body to close the valve, a diaphragm within said needle, a diaphragm tube supporting said diaphragm from said shell, an annular head on said needle and serving with said diaphragm as transverse walls dividing into three tandem compartments the space within the telescoping members constituted by said inner shell and needle, said tube having an opening affording communication between the interior of the tube and one of said compartments, and means within said telescoping members and outside of said tube providing a passage for the transfer of pressure fluid to and from another of said compartments; said means comprising a pressure fluid tube extending through the middle compartment and parallel to said diaphragm tube, and means securing said pressure fluid tube to one of said transverse walls, said pressure fluid tube having a sliding fit within an opening in the other transverse wall.

26. A valve comprising a valve body having a fluid conduit therethrough, a shell within said body, a needle telescoping within said shell and adapted to engage a seat carried by said body to close the valve, a diaphragm within said needle, a diaphragm tube supporting said diaphragm from said shell, an annular head on said needle and serving with said diaphragm as transverse walls dividing into three tandem compartments the space within the telescoping members constituted by said inner shell and needle, said tube having an opening affording communication between the interior of the tube and one of said compartments, and means within said telescoping members and outside of said tube providing a passage for the transfer of pressure fluid to and from another of said compartments; said means comprising a tubular sleeve surrounding said diaphragm tube and spaced therefrom to provide an annular pressure fluid passage.

LESLIE N. McCLELLAN.
PHILLIP A. KINZIE.
JOHN L. SAVAGE.
CHARLES M. DAY.